(12) United States Patent
Simon et al.

(10) Patent No.: US 9,556,057 B2
(45) Date of Patent: Jan. 31, 2017

(54) REINFORCED TERMINAL EAR FOR BUSHING

(71) Applicant: 3B-Fibreglass sprl, Battice (BE)

(72) Inventors: Philippe Simon, Battice (BE); Dimitri Laurent, Battice (BE)

(73) Assignee: 3B-Fibreglass Sprl, Battice (BE)

( * ) Notice: Subject to any disclaimer, the term of this patent is extended or adjusted under 35 U.S.C. 154(b) by 0 days.

(21) Appl. No.: 14/404,676

(22) PCT Filed: May 17, 2013

(86) PCT No.: PCT/EP2013/060304
§ 371 (c)(1),
(2) Date: Dec. 1, 2014

(87) PCT Pub. No.: WO2013/178494
PCT Pub. Date: Dec. 5, 2013

(65) Prior Publication Data
US 2015/0158754 A1   Jun. 11, 2015

(30) Foreign Application Priority Data

May 29, 2012 (EP) .................................... 12169806

(51) Int. Cl.
*C03B 37/09* (2006.01)
(52) U.S. Cl.
CPC .................. *C03B 37/091* (2013.01)
(58) Field of Classification Search
CPC ................ C03B 37/091; B29C 2045/2733
USPC ........ 65/495; 29/419.1; 174/11 BH, 18, 657, 174/663, 668, 669
See application file for complete search history.

(56) References Cited

U.S. PATENT DOCUMENTS

| 3,512,948 | A | | 5/1970 | Glaser et al. |
| 4,516,995 | A | | 5/1985 | Bhatti et al. |
| 4,634,460 | A | * | 1/1987 | Fowler .................... C03B 37/08 219/780 |

(Continued)

FOREIGN PATENT DOCUMENTS

| SU | 704917 A1 | 12/1979 |
| SU | 908753 A1 | 2/1982 |
| WO | 0174727 A1 | 10/2001 |

*Primary Examiner* — Jason L Lazorcik
*Assistant Examiner* — Cynthia Szewczyk
(74) *Attorney, Agent, or Firm* — Avery N. Goldstein; Blue Filament Law PLLC

(57) ABSTRACT

The present invention concerns a bushing assembly comprising terminal ears (1) coupled to opposed end walls (2) of the bushing assembly, for heating the bushing tip plate and walls, each of said terminal ears comprising: (a) an electrically conductive plate, said conductive plate comprising at least a first portion (1A) extending along a longitudinal 1D axis (X1) from a first terminal edge (1D) substantially normal to said longitudinal axis (X1) 1B and coupled to a bushing end wall (2), and further comprising a second, free terminal edge (1C) connectable to a source of power, and (b) at least one elongated reinforcing member (1B) coupled to said at least first portion (1A) of said plate to increase the bending moment of the latter, characterized in that, said at least one elongated reinforcing member (1B) extends from, or adjacent to the plate first terminal edge (1D) along a direction non parallel to said longitudinal axis (X1).

20 Claims, 4 Drawing Sheets

(56) References Cited

U.S. PATENT DOCUMENTS 6,427,492 B1 * 8/2002 Sullivan ............... C03B 37/091
65/495
2003/0167802 A1 9/2003 Hanna

* cited by examiner

REINFORCED TERMINAL EAR FOR BUSHING

TECHNICAL FIELD

The present invention concerns terminal ears for heating bushings for attenuating molten glass into glass fibres. In particular, it concerns a reinforced terminal ear able to resist the thermo-mechanical strains undergone during use of the bushing.

BACKGROUND OF THE INVENTION

Glass fibres can be produced by melting a glass composition in a melter and drawing them out through the tip plate of a bushing assembly. A bushing assembly is generally in the form of a rectangular box with two pairs of opposed side and end walls forming the perimeter thereof with an opening at the top in fluid communication with the melter. The bottom floor comprises a tip plate which is a plate comprising a multitude of orifices or tips through which the glass melt can flow to form fibres, which are attenuated to reach their desired diameter. To ensure an optimal control of the viscosity, the temperature of the tip plate must be controlled accurately. The temperature of the tip plate depends on the glass melt composition but is generally well above 1200° C. Because of the extreme working conditions, the various components of a bushing assembly are made of platinum or platinum alloys, typically rhodium-platinum alloys.

The bushing is heated electrically by passing current through the body of the bushing from a first connector clamped to a first terminal ear, electrically coupled to a first end wall of the bushing body, to a second connector clamped to a second terminal ear, thermally coupled to a second end wall of the bushing body, opposite the first end wall. A wide variety of terminal ear geometries have been proposed in the art. It can be said that in practically all cases they comprise at least a thin plate extending transverse from a bushing end wall. To prevent the connectors, usually made of copper, from overheating and from deforming, they are usually water cooled. The terminal ears are therefore exposed to severe thermal gradients, between the free end thereof, where water cooled connectors are clamped and the end coupled to the bushing end wall which is at temperatures of well above 1200° C. Such extreme temperature gradients have two drawbacks; first the cooling of the connectors also cools the end walls of the bushing, when a homogeneous temperature is required at the level of the bushing tip plate. Second, they create substantial thermal strain in the terminal ears which are fixed at both opposite ends of the bushing body because of varying levels of thermal expansion as the temperature varies over 1000° C. in a few decimeters, leading to warping of the ears and generation of substantial internal stresses. Furthermore the terminal ears are also exposed to vibrations generated by the electrical generator feeding electrical current for the heating of the ears or the flow of molten glass through the tip plate and transmitted to the terminal ears through the side walls. The combination of thermal strain and vibrations eventually leads to the failure by fatigue at high temperature of the terminal ears.

Reinforced ears have been proposed in the art, in order to prolong the service life of the ears. For example, U.S. Pat. No. 4,026,689 proposes a T-shaped terminal ear comprising a top plate, extending substantially horizontally from an end wall of a bushing assembly and a bottom plate, substantially normal to both top plate and bushing end wall, without contacting the latter. An electrical connector can be coupled to the free end of the bottom plate. The bottom plate also acts as stiffening rib to the top plate, but the welding between the top and bottom plates is quite sensitive to the thermal and fatigue strains to which the ear is exposed.

U.S. Pat. No. 4,634,460 discloses a terminal ear for heating a drain bushing for use in the start-up of a glass melting furnace. The terminal ear is reinforced with a gusset, which is a generally U-shaped strip or band having a central portion and two tapered legs extending at substantially right angles therefrom. The gusset is coupled to the terminal ear, providing support for the ear. Unlike bushings for attenuating glass fibres, comprising a tip plate with a multitude of small tips, a drain bushing comprises only a limited number of large drain holes. For these reasons, the ears and the gussets can be integrally connected to the bottom wall of the bushing as by welding, which is not the case with bushing assemblies for the production of glass fibres.

U.S. Pat. No. 3,512,948 discloses a bushing assembly comprising a terminal in the form of an inverted Y formed from two plate members of a platinum-rhodium alloy, the stem of which extending up the centre line of the end wall and being connected through the wall to an internal V-shaped grid. The arms of the Y extend across the end wall but terminate short of the edges. The line and angle of the arms are calculated to give a desired current distribution across that wall, and have the molten glass within the feeder, to eliminate "cold spots" in the corners of the feeder.

WO01/74727 discloses a terminal ear for conducting electrical current to a bushing, the terminal ear comprising: a conducting portion having a longitudinal axis, being coupleable to the bushing at a first end of said conducting portion, and having a first cross-section in a plane perpendicular to said longitudinal axis; and an elongate support portion, coupled to said conducting portion, extending substantially parallel to said longitudinal axis, and having a second cross-section in a plane perpendicular to said longitudinal axis, said second cross-section having a moment of inertia greater than a moment of inertia of said first cross-section. Although the terminal ear disclosed in WO01/74727 has a higher resistance to bending, its resistance to torsion and warping is not satisfactory.

There remains a need for an optimized design of a bushing terminal ear with enhanced resistance to thermal and fatigue strain and thus with prolonged service time thereof. This and other problems are solved by the present invention.

SUMMARY OF THE INVENTION

The present invention is defined in the appended independent claims. Preferred embodiments are defined in the dependent claims. In particular, the present invention concerns a bushing assembly comprising terminal ears coupled to opposed end walls of the bushing assembly, for heating the bushing tip plate and walls, each of said terminal ears comprising:
  (a) an electrically conductive plate, said conductive plate comprising at least a first portion extending along a longitudinal axis ($X1$) from a first terminal edge substantially normal to said longitudinal axis ($X1$) and coupled to a bushing end wall, and further comprising a second, free terminal edge connectable to a source of power, and
  (b) at least one elongated reinforcing member coupled to said at least first portion of said plate to increase the bending moment of the latter, characterized in that, said at least one elongated reinforcing member extends from, or adjacent to the plate first terminal edge along a direction non parallel to said longitudinal axis (X1).

In a preferred embodiment, the at least one elongated reinforcing member contacts the end wall coupled to the first terminal edge and is made of a conductive material, preferably the same material as the plate first portion and is preferably welded or soldered to both said end wall and plate first portion.

It is preferred that each terminal ear comprises at least two or more elongated reinforcing members. In one embodiment, it comprises two reinforcing members converging toward one another along the longitudinal axis (X1) from the first terminal edge, forming a V, preferably but not necessarily joining at the vertex of the V, or forming a X. In an alternative embodiment, each terminal ear comprises three elongated reinforcing members forming an italic N, preferably but not necessarily joining at each vertex of the N, or comprises four or more elongated reinforcing members forming a W or a series of adjacent V's, preferably but not necessarily joining at each vertex of the W or V's.

The reinforcing members may be beams of various cross-sections such as, but not restricted to, of an I, T, Γ, Π, Λ, ∩, †, or ‡. It is preferred that all the reinforcing members be coupled to a same side of the top plate first portion, i.e., either to the top side or to the bottom side thereof. The conductive plate is preferably folded over a folding line substantially parallel to both first and second terminal edges, the first portion of the plate comprising the first terminal edge and the folding line being transverse to a second planar portion comprising said folding line and the second, free terminal edge. The reinforcing members extending preferably on the first portion only of the conductive plate.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 1:
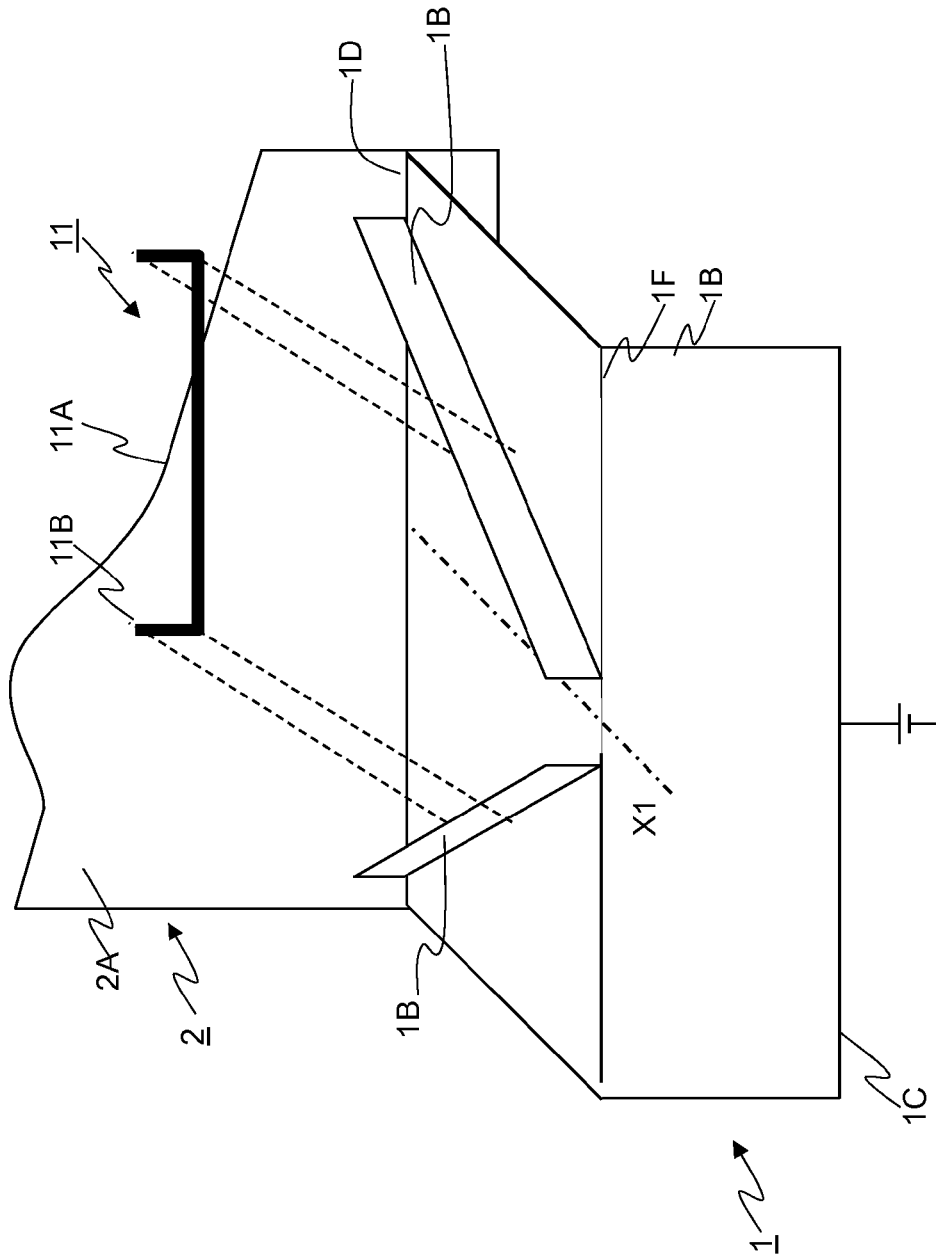
FIG. 1: shows a terminal ear according to the present invention.
Figure 2:
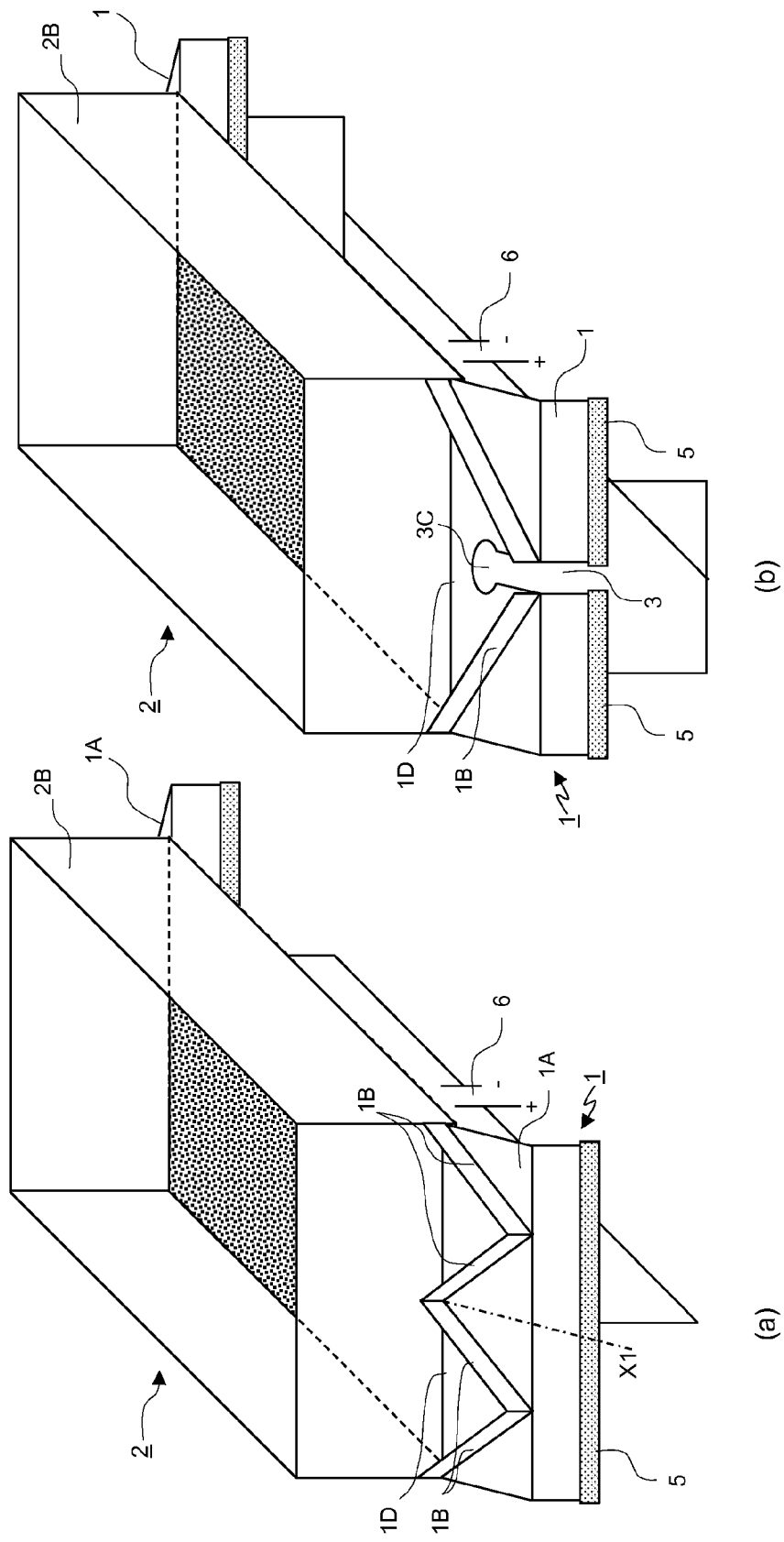
FIG. 2: shows a bushing assembly comprising a terminal ear according to two embodiments of the present invention.

As illustrated in FIGS. 1 and 2, a bushing assembly comprises two terminal ears (1) in the shape of thin electrically conductive plates in electroconductive contact through a first terminal edge (1D) thereof with two opposite end walls (2A) of the bushing (2). The perimeter of the bushing (2) is generally defined by two side walls (2B) and two end walls (2A) as illustrated in FIG. 2. Each terminal ear comprises at least a first portion (1A) extending from said first terminal edge (1D) along a longitudinal axis (X1) substantially normal to the first terminal edge (1D). Each terminal ear (1) comprises a second, free, terminal edge (10) opposite the first terminal edge (1D). The second, free terminal edge (10) can be located at the opposite end of the first portion (1A) of the plate, or it can belong to a second portion of the ear, separated from the first portion (1A) by a folding line (1F), preferably substantially normal to the first direction (X1) as illustrated in FIGS. 1 and 2. As illustrated in FIG. 2, in use a connector (5) is coupled to the second, free terminal edge (10) of each of the two terminal ears (1) and the two connectors are connected to an electrical source (6) driving the current from one pole of the electrical source to one connector (5), through a first ear (1), through the bushing walls (2A, 2B) and tip plate, then out through the second ear and connector thereof to the source's second pole. Heating of the ears and bushing walls and tip plate is achieved by Joule effect.

The connectors (5) are usually made of copper or alloy thereof and should be protected from excessive heat radiating from the bushing walls. For this reason, the connectors are often water cooled, thus creating extreme temperature gradients (about 1000° C.) over a short distance of a couple of decimeters only, which are responsible for the generation of important internal stresses in the terminal ear. The system would probably find an equilibrium state if the electrical generator or the flow of molten glass through the tip plate did not generate vibrations transmitted to the terminal ears through the bushing end walls (2A) and the first terminal edge (1D). These vibrations combined with high temperatures and high temperature gradients lead to the deformation of the thin terminal ears and eventually to their failure. It was observed that the main strain fields formed on the terminal ears were not necessarily following the direction of the temperature gradient, but instead followed directions transverse thereto, probably driven by the internal stresses accumulated in the material. Reinforcing the terminal ears with reinforcing members extending parallel to the first direction (X1) as taught in WO01/74727 may improve the resistance of the terminal ear against bending about a direction substantially normal to said first direction (X1), but is less efficient against any torsion and strain fields extending in a direction between the one of the longitudinal direction (X1) and a direction normal thereto, such as for example along a direction forming an angle of about 45 deg with respect to the terminal ear first edge (1D). For this reason, terminal ears according to the present invention are provided with one or more elongated reinforcing members (1B) coupled to said at least first portion (1A), which extend from, or adjacent to the plate first terminal edge (1D) along a direction which is transverse, i.e., non-parallel, albeit not normal, to said longitudinal axis (X1). Preferably, the elongated reinforcing members (1B) extend away from the plate first terminal edge (1D) forming an angle therewith comprised between 10 and 80 deg, preferably between 20 and 70 deg, more preferably, between 30 and 61 deg; most preferably, the angle is 45±5 deg.

Depending on whether the one or more reinforcing members (1B) should contribute or not to the heating of the bushing, one end of said reinforcing members may contact or not the corresponding end wall (2A) at the level of the first terminal edge (1D) of the terminal ear. In the latter case (i.e., no contact) current would be transported to the bushing end wall (2A) through the terminal ear first portion (1A) only, the reinforcing members fulfilling a mechanical function only. On the other hand, if a reinforcing member (1B) contacts the bushing end wall (2A) it fulfils both a mechanical and thermal functions as the current would also be transported to the bushing end wall through the reinforcing members, thus increasing the contact area between the terminal ear assembly (1) and the bushing end wall (2A). How the current should be brought to the bushing walls to yield a desired thermal pattern within the molten glass transiting through the bushing assembly is a recurrent problem in the field and is usually addressed by the person skilled in the art by finite elements modelling (fem). The reinforcing members (1B) are preferably made of a conductive material, preferably the same material as the plate first portion (1A) and are preferably welded or soldered to a surface of the plate first portion (1A) and, if it applies, to the bushing end wall (2A).

Figure 3:
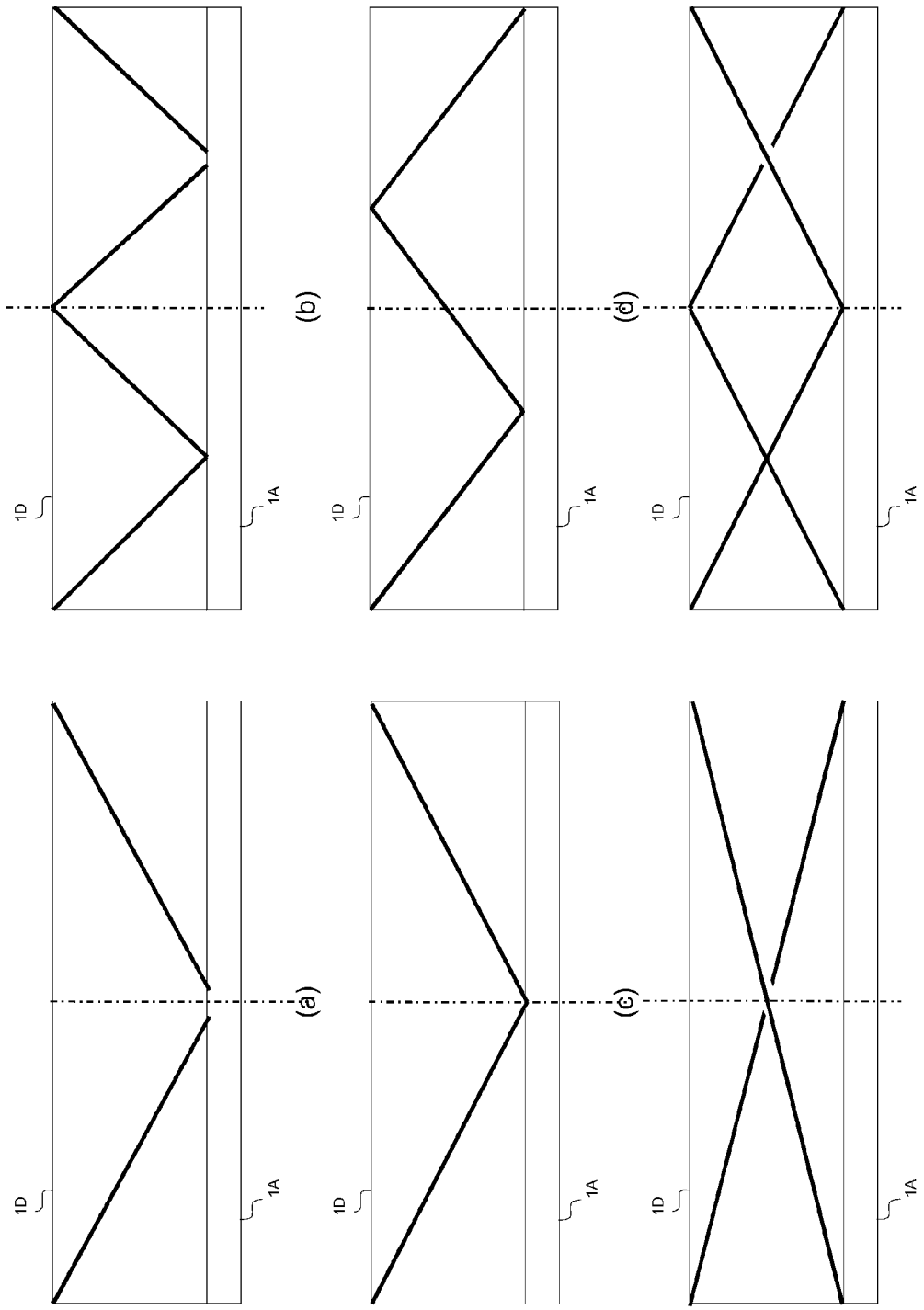
FIG. 3: shows top views of terminal ears according to the present invention.

A terminal ear according to the present invention preferably comprises at least two elongated reinforcing members (1B). As illustrated in FIG. 3, many geometrical dispositions of the reinforcing members can be implemented. Two reinforcing members may converge towards one another along the longitudinal axis (X1) away from the first terminal edge (1D), forming a V, or an X. Again, the two reinforcing members may or may not join at the vertex of the V or at the crossing point of the X (cf. FIG. 3(a), (c), (e). Two reinforcing members may diverge from one another along the longitudinal direction (X1) away from the first terminal edge (1D) to form, for example, a Λ. Combining converging and diverging reinforcing members allows the formation of W, italic N, or double-X as illustrated in FIG. 3(b), (d), (f). These various geometries are meant to best reinforce the terminal ear along the main strain fields developing in the terminal ear, and the optimal geometry will depend on each particular bushing assembly (e.g., bushing wall geometry, desired temperature of the glass, geometry of the terminal plates, and the like). Here again, fem analysis of a particular case can most advantageously be used to assess the main direction(s) followed by the strain fields. If required, additional reinforcing members extending along a direction parallel to the first direction (X1) as taught in in WO01/74727 can be added to the transverse reinforcing members to complete the stiffening array. The reinforcing members (1B) represented in FIG. 3 sometimes contact each other or the first terminal edge (1D), sometimes they do not, to illustrate the versatility of the present invention. It is preferred that the reinforcing members contact the bushing end wall (2A) and thus contribute to the heating of the bushing walls.

Figure 4:
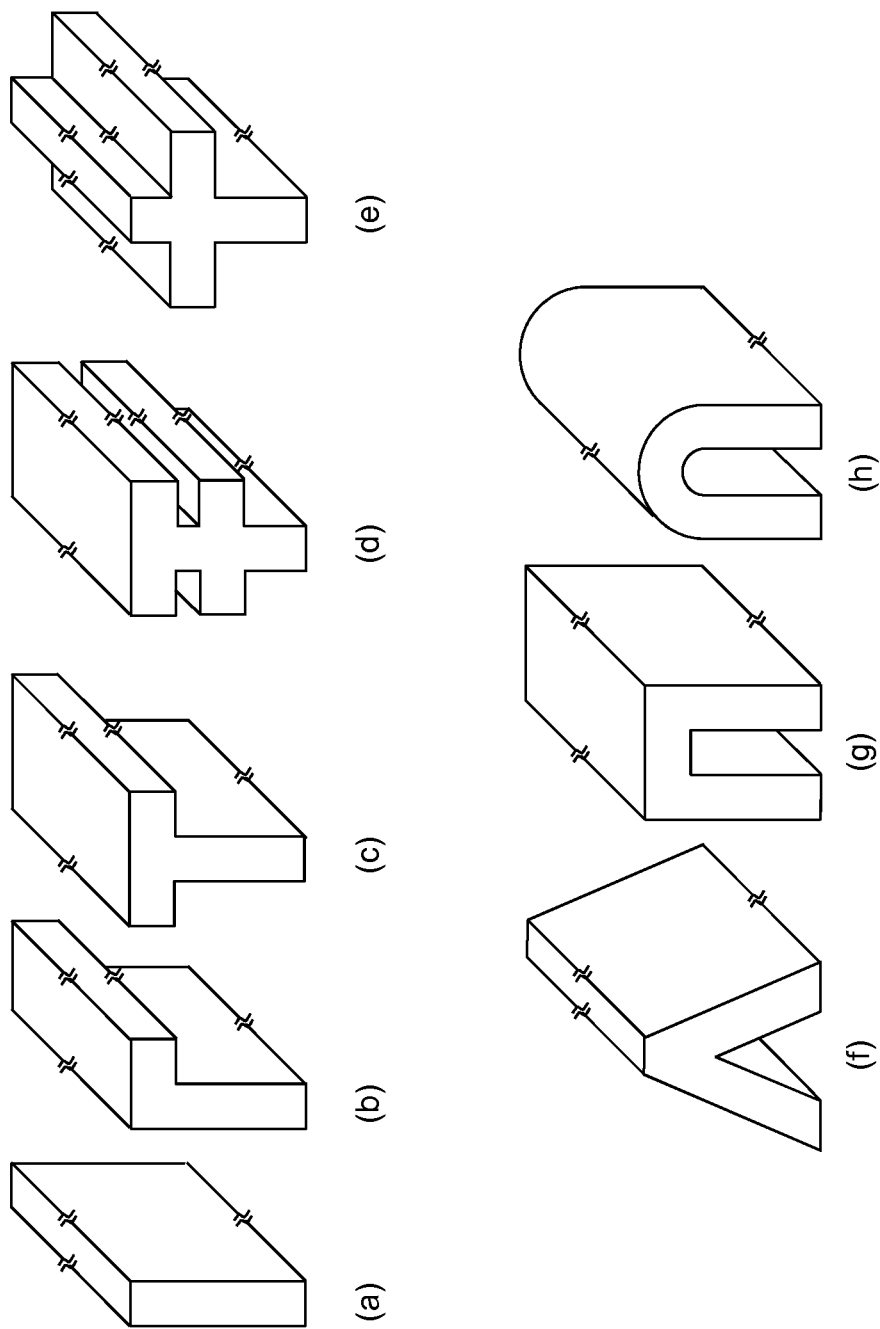
FIG. 4: shows various geometries of reinforcing members according to the invention.

The reinforcing member(s) (1B) increase the bending moment of the terminal ear (1). As illustrated in FIG. 1, a cross section of the terminal ear normal to the longitudinal axis (X1) is composed of a first linear portion (11A) corresponding to the contribution to the bending moment of the first portion (1A) of the terminal ear, and of transverse portions (11B) corresponding to the contribution of the reinforcing members, the latter increasing the bending moment of the terminal ear. The elongated reinforcing members may have different geometries. As illustrated in FIGS. 1, 2, and 4(a), the reinforcing members can be in the form of I-beams. Alternatively, the elongated reinforcing members can comprise stiffening ribs for increasing their bending moment in various directions. This can be advantageous to stabilize a terminal ear against torsional strains in various directions. In particular, the elongated reinforcing memebers can be in the shape of Γ, T, ‡, †, Λ, Π, or ∩, as illustrated in FIG. 4(b)-(h). The profiles with two "legs", like Λ, Π, or ∩, as illustrated in FIG. 4(f)-(h) are particularly effective for reinforcing and stabilizing terminal ears exposed to strong bending moments in various directions.

In a preferred embodiment illustrated in FIG. 2(b), the terminal ear comprises a slot (3) comprising:
  a first, open end of width, $W_A$, at the second, free edge (1C) of the plate,
  an elongated portion extending towards said first edge (1D) of gap width, $W_B$, and
  a second, closed end (3C), separate from the first edge (1D) of the terminal ear, and having a curved geometry;

It is further preferred that the curvature, $1/(2R)$, at any point of the curved second end of the slot is less than the reciprocal, $1/W_0$, of the smallest gap width, $W_0$, of both slot first open end, $W_A$, and elongated portion, $W_B$, wherein R is the radius at any point of the curved second end (3C). The slot (3) permits to release a substantial fraction of the internal stresses by allowing some deformation of the half portion of the plate on one side of the gap with respect to the other half portion on the opposite side of the slot. The elongated reinforcing members (1B) permit to reinforce each half portion of the plate independently from one another. This embodiment allows prolonging even further the service life of terminal ears in a bushing assembly.

The invention claimed is:

1. A bushing assembly comprising terminal ears (1) coupled to opposed end walls (2) of the bushing assembly, for heating the bushing tip plate and walls, each of said terminal ears comprising:
   (a) an electrically conductive plate, said conductive plate comprising at least a first portion (1A) extending along a longitudinal axis (X1) from a first terminal edge (1D) substantially normal to said longitudinal axis (X1) and coupled to a bushing end wall (2A), and further comprising a second, free terminal edge (1C) connectable to a source of power, and
   (b) at least one elongated reinforcing member (1B) coupled to said at least first portion (1A) of said plate to increase the bending moment of the latter,
   characterized in that, said at least one elongated reinforcing member (1B) extends from, or adjacent to the plate first terminal edge (1D) along a direction non parallel and non normal to said longitudinal axis (X1).

2. The bushing assembly according to claim 1, wherein the at least one elongated reinforcing member (1B) contacts the end wall (2A) coupled to the first terminal edge (1D) and is made of a conductive material.

3. The bushing assembly according to claim 2, wherein the at least one elongated reinforcing member (1B) is formed of the same material as the plate first portion (1A).

4. The bushing assembly according to claim 2, wherein the at least one elongated reinforcing member (1B) is welded or soldered to both said end wall (2A) and plate first portion (1A).

5. The bushing assembly according to claim 1, comprising at least two elongated reinforcing members (1B).

6. The bushing assembly according to claim 5, wherein said at least two elongated reinforcing members (1B) converge toward one another along the longitudinal axis (X1) from the first terminal edge (1D), forming a V.

7. The bushing assembly according to claim 5, wherein said at least two elongated reinforcing members (1B) join at the vertex of the V, or forming a X.

8. The bushing according to claim 5, wherein said at least two elongated reinforcing members (1B) are converging toward one another along the longitudinal axis (X1) from the first terminal edge (1D), forming a V.

9. The bushing according to claim 5, wherein said at least two elongated reinforcing members (1B) are converging toward one another along the longitudinal axis (X1) from the first terminal edge (1D), forming an X.

10. The bushing assembly according to claim 1, wherein each terminal ear comprises at least three elongated reinforcing members (1B) forming an italic N.

11. The bushing assembly according to claim 10, wherein said at least three elongated reinforcing members (1B) join at each vertex of the N.

12. The bushing assembly according to claim 10, wherein said at least three elongated reinforcing members (1B) forming an italic N are four or more elongated reinforcing members forming a W or a series of adjacent Vs.

13. The bushing assembly according to claim 10, wherein said at least three elongated reinforcing members (1B) forming an italic N are four or more elongated reinforcing members forming a W or a series of adjacent Vs join at each vertex of the W.

14. The bushing assembly according to claim 1, wherein the elongated reinforcing members (1B) are in the shape of beams having a cross section substantially in the shape of one of a I, T, Γ, Π, Λ, ∩, †, or ‡.

15. The bushing assembly according to claim 1, wherein all the reinforcing members (1B) are coupled to the top or to the bottom side of the plate first portion (1A).

16. The bushing assembly according to claim 1, wherein the plate second terminal edge (1C) is not on the plane defined by the first terminal edge (1D) and the longitudinal axis (X1).

17. The bushing assembly according to claim 1, wherein each terminal ear comprises a slot (3) comprising:
a first, open end of width, $W_A$, at the second, free edge (1C) of the plate,
an elongated portion extending towards said first edge (1D) of gap width, $W_B$, and
a second, closed end (3C), separate from the first edge (1D) of the terminal ear, and having a curved geometry.

18. The bushing assembly according to claim 17, wherein the curvature, $1/(2R)$, at any point of the curved second end (3C) of the slot is less than the reciprocal, $1/W_0$, of the smallest gap width, $W_0$, of both slot first open end, $W_A$, and elongated portion, $W_B$, wherein R is the radius at any point of the curved second end (3C).

19. The bushing assembly according to claim 1, wherein the elongated portion of the slot extends substantially parallel to the longitudinal axis (X1).

20. The bushing according to claim 1, wherein the plate second terminal edge (1C) is not on the plane defined by the first terminal edge (1D) and the longitudinal axis (X1), and the conductive plate is folded over a folding line (1F) substantially parallel to both first and second terminal edges (1C, 1D).

* * * * *